United States Patent
Xi

(10) Patent No.: US 8,145,933 B2
(45) Date of Patent: Mar. 27, 2012

(54) POWER CONTROL CIRCUIT

(75) Inventor: Chun-Fang Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 117 days.

(21) Appl. No.: 12/835,739

(22) Filed: Jul. 14, 2010

(65) Prior Publication Data

US 2011/0227613 A1   Sep. 22, 2011

(30) Foreign Application Priority Data

Mar. 17, 2010   (CN) ............... 2010 1 0126232

(51) Int. Cl.
*G06F 1/32* (2006.01)

(52) U.S. Cl. ........ 713/323; 327/530; 327/538; 327/546; 713/300; 713/310; 713/320; 713/330

(58) Field of Classification Search .......... 327/544–547
See application file for complete search history.

(56) References Cited

U.S. PATENT DOCUMENTS

| | | | |
|---|---|---|---|
| 6,691,238 B1 * | 2/2004 | Forbes et al. | 713/323 |
| 7,577,855 B2 * | 8/2009 | Dove | 713/300 |
| 7,805,623 B2 * | 9/2010 | Jia et al. | 713/300 |
| 7,814,345 B2 * | 10/2010 | Shaver et al. | 713/300 |
| 7,930,570 B2 * | 4/2011 | Zou et al. | 713/300 |
| 7,992,025 B2 * | 8/2011 | Zou | 713/323 |
| 2008/0168288 A1 * | 7/2008 | Jia et al. | 713/323 |
| 2009/0161472 A1 * | 6/2009 | Wang et al. | 365/226 |
| 2010/0001589 A1 * | 1/2010 | Shi | 307/115 |
| 2010/0313049 A1 * | 12/2010 | Chen | 713/323 |
| 2011/0004778 A1 * | 1/2011 | Tsukamoto et al. | 713/324 |
| 2011/0121882 A1 * | 5/2011 | Xi | 327/427 |
| 2011/0197084 A1 * | 8/2011 | Xi | 713/323 |

* cited by examiner

*Primary Examiner* — Thomas J Hiltunen
(74) *Attorney, Agent, or Firm* — Altis Law Group, Inc.

(57) ABSTRACT

A power control circuit includes an input/output controller hub (ICH), and first to third metal-oxide-semiconductor field effect transistors (MOSFETs). A drain of the first MOSFET is connected to a standby power source through a first resistor. A gate of the first MOSFET is connected to a sleep control terminal of the ICH through a second resistor. A drain of the second MOSFET is connected to the drain of the first MOSFET through a third resistor. A gate of the second MOSFET is connected to a general purpose input/output terminal of the ICH through a fourth resistor. A source of the third MOSFET is connected to the standby power source. A gate of the third MOSFET is connected to the drain of the second MOSFET. A drain of the third MOSFET is connected to a power terminal of an onboard network interface card.

4 Claims, 1 Drawing Sheet

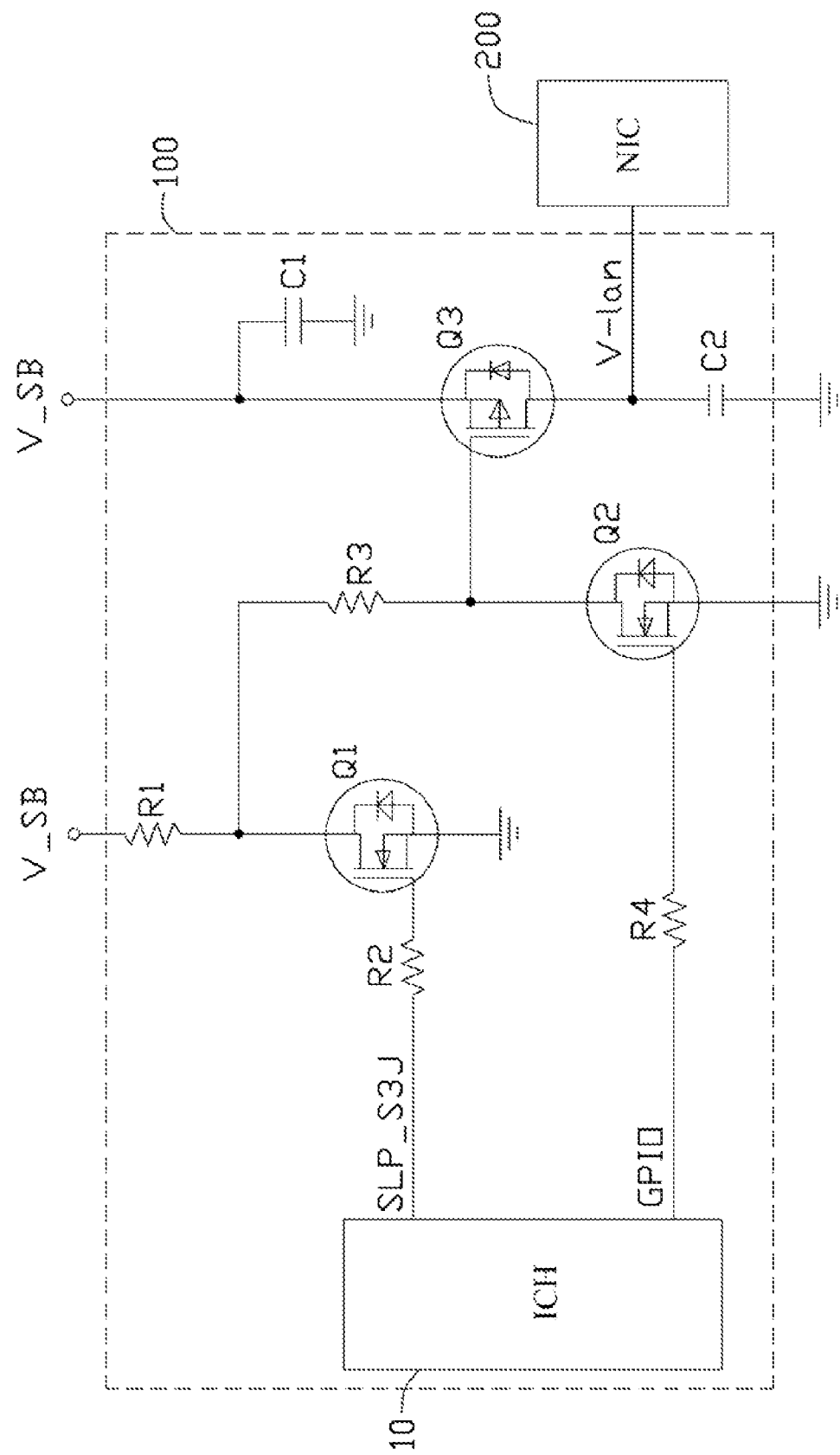

POWER CONTROL CIRCUIT

BACKGROUND

1. Technical Field

The present disclosure relates to a power control circuit.

2. Description of Related Art

In a standby state (S5), a power control circuit of a computer turns off all power except a standby power. The power control circuit provides power to an onboard network interface card (NIC) when a wake-on-LAN function of the computer is activated. To activate the wake-on-LAN function, an active management technology (AMT) module is needed. On a main board with the AMT module, the power of the NIC is controlled by a sleep control (SLP_M) signal and a general purpose input/output (GPIO) signal of an Input/Output controller hub (ICH). However, on a main board without the AMT module, the ICH cannot output the SLP_M signal. Therefore, the wake-on-LAN function cannot be activated.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, the view is schematic, and like reference numerals designate corresponding parts throughout.

The FIGURE is a circuit diagram of an exemplary embodiment of a power control circuit.

DETAILED DESCRIPTION

The disclosure, including the accompanying drawing is illustrated by way of example and not by way of limitation. It should be noted that references to "an" or "one" embodiment in this disclosure are not necessarily to the same embodiment, and such references mean at least one.

Referring to the FIGURE, an exemplary embodiment of a power control circuit 100 includes an input/output controller hub (ICH) 10, a first metal-oxide-semiconductor field effect transistor (MOSFET) Q1, a second MOSFET Q2, a third MOSFET Q3, resistors R1-R4, and capacitors C1 and C2. The first and second MOSFETs Q1 and Q2 are n-channel MOSFETs. The third MOSFET Q3 is a p-channel MOSFET. The power control circuit 100 can be set on a main board of a computer without an active management technology (AMT) module.

The ICH 10 includes a sleep control terminal SLP_S3J and a general purpose input/output terminal GPIO.

A drain of the first MOSFET Q1 is connected to a standby power source V_SB through the resistor R1. The voltage of the standby power source V_SB is 3.3 volts. A gate of the first MOSFET Q1 is connected to the sleep control terminal SLP_S3J of the ICH 10 through the resistor R2. A source of the first MOSFET Q1 is grounded.

A drain of the second MOSFET Q2 is connected to the drain of the first MOSFET Q1 through the resistor R3. A gate of the second MOSFET Q2 is connected to the general purpose input/output terminal GPIO of the ICH 10 through the resistor R4. A source of the second MOSFET Q2 is grounded.

A source of the third MOSFET Q3 is connected to the standby power source V_SB. The source of the third MOSFET Q3 is also grounded through the capacitor C1. A gate of the third MOSFET Q3 is connected to the drain of the second MOSFET Q2. A drain of the third MOSFET Q3 is grounded through the capacitor C2. The drain of the third MOSFET Q3 is also connected to a power terminal V-lan of an onboard network interface card (NIC) 200.

Without an AMT module on the main board, the ICH 10 cannot output a sleep control (SLP_M) signal. The cycle time of the sleep control terminal SLP_S3J is equal to the cycle time of the SLP_M signal. Therefore, the sleep control terminal SLP_S3J has the same function as the SLP_M signal.

When the computer is in state S5 and a wake-on-LAN function of the computer is not activated, the sleep control terminal SLP_S3J and the general purpose input/output terminal GPIO are at low voltage level. The first MOSFET Q1 and the second MOSFET Q2 are turned off. The gate of the third MOSFET Q3 is at a high voltage level. The third MOSFET Q3 is turned off. The power terminal V-lan of the NIC 200 receives nothing and the NIC 200 does not work.

When the computer is in state S5 and the wake-on-LAN function of the computer is activated, the sleep control terminal SLP_S3J is at a low voltage level and the general purpose input/output terminal GPIO goes to a high voltage level. The first MOSFET Q1 is turned off. The second MOSFET Q2 is turned on. The gate of the third MOSFET Q3 goes to a low voltage level. The third MOSFET Q3 is turned on. The standby power source V_SB supplies power to the power terminal V-lan of the NIC 200 through the third MOSFET Q3. The NIC 200 works to wake up the computer.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power control circuit, comprising:
   an input/output controller hub (ICH) comprising a sleep control terminal and a general purpose input/output (GPIO) terminal;
   a first metal-oxide-semiconductor field effect transistor (MOSFET), wherein a drain of the first MOSFET is connected to a standby power source through a first resistor, a gate of the first MOSFET is connected to the sleep control terminal of the ICH through a second resistor, a source of the first MOSFET is grounded;
   a second MOSFET, wherein a drain of the second MOSFET is connected to the drain of the first MOSFET through a third resistor, a gate of the second MOSFET is connected to the GPIO terminal of the ICH through a fourth resistor, a source of the second MOSFET is grounded; and
   a third MOSFET, wherein a source of the third MOSFET is connected to the standby power source, a gate of the third MOSFET is connected to the drain of the second MOSFET, a drain of the third MOSFET is connected to a power terminal of an onboard network interface card.

2. The power control circuit of claim 1, wherein the first and second MOSFETs are n-channel MOSFETs, and the third MOSFET is a p-channel MOSFET.

3. The power control circuit of claim 1, wherein the source of the third MOSFET is grounded through a capacitor.

4. The power control circuit of claim 1, wherein the drain of the third MOSFET is grounded through a capacitor.

* * * * *